United States Patent [19]
Olsson et al.

[11] 3,972,099
[45] Aug. 3, 1976

[54] CENTERING DEVICE FOR BODIES HAVING CIRCULAR CROSS-SECTION

[75] Inventors: Curt Olsson, Bandhagen; Thorbjorn Sahlin, Vasteras, both of Sweden

[73] Assignee: AB Asea-Atom, Vasteras, Sweden

[22] Filed: Dec. 24, 1974

[21] Appl. No.: 536,228

[30] Foreign Application Priority Data
Dec. 31, 1973  Sweden.............................. 73176166

[52] U.S. Cl. ................................ 29/200 P; 29/272; 228/44.5; 228/48; 228/49
[51] Int. Cl.[2].................. B23P 19/00; B23K 37/04; B23K 1/14
[58] Field of Search .................. 29/200 P, 234, 272; 228/4, 6, 44, 48, 49; 214/1 P, 338, 340; 269/258, 278

[56] References Cited
UNITED STATES PATENTS

| | | |
|---|---|---|
| 2,635,573 | 4/1953 | Taylor.................................. 228/49 |
| 3,182,171 | 5/1965 | Persson................................ 228/49 |
| 3,726,462 | 4/1973 | Ronnkuist............................ 228/48 |
| 3,806,021 | 4/1974 | Moroz et al....................... 29/200 P |

FOREIGN PATENTS OR APPLICATIONS

| | | |
|---|---|---|
| 855,196 | 11/1960 | United Kingdom............... 214/34 D |

*Primary Examiner*—James L. Jones, Jr.

[57] ABSTRACT

An arrangement for centering a tube includes guides on which are mounted blocks slidable towards and away from each other by a hydraulic cylinder arrangement. Each of the blocks has a frame pivoted on it to rock about an axis perpendicular to the direction of movement of the blocks, the turning movement of the frames on the blocks being limited by an adjustable set screw and a spring on opposite sides of the frame pivot. Each frame carries either two rollers turnable on spaced axes which are parallel to the length of the tube or a single roller mounted to turn on an axis perpendicular to the direction of movement of the blocks, this roller having a central portion of small diameter and end portions of greater diameter.

4 Claims, 8 Drawing Figures

CENTERING DEVICE FOR BODIES HAVING CIRCULAR CROSS-SECTION

BACKGROUND OF THE INVENTION

1. Field of the Invention

The present invention relates to a centering device for bodies having circular cross-section, comprising two blocks which are arranged to move against each other with a controlled movement with the aid of a power means, each block being provided with oblique contact surfaces for the tube. It is known to center an article such as a tube by clamping it in a screw vice having two blocks, each of which has two contact surfaces which are obliquely positioned in relation to each other.

SUMMARY OF THE INVENTION

In a centering device according to the invention, it is required that the clamped body be given a rotating or axial movement. Only rolling friction can then be allowed. In a centering device according to the invention, the rollers required for this purpose are arranged in such a manner that they act as centering members at the same time, in which case a construction is obtained which is most favorable with regard to accuracy and wear-resistance.

According to the invention, the device includes two blocks mounted for sliding movement towards and away from each other and a hydraulic cylinder for producing relative movement of the blocks. On each of the blocks a frame is turnably mounted about an axis parallel to the axis of the tube.

Means are provided for limiting the rocking movement of the blocks. In one form of the invention, there are two rollers turnably mounted on each frame about spaced axes parallel to the length of the tube.

In the other form, there is a single roller mounted on each block for rotation around an axis perpendicular to the direction of movement of the blocks, the center part of this roller being of small diameter and the outer parts of greater diameter.

In the first case, the bite between the two rolls, and in the second case the outwardly sloping portions of the rolls constitute converging surfaces engageable with the tube.

BRIEF DESCRIPTION OF THE DRAWINGS

The invention in the following will be described with reference to the accompanying drawings, in which.

DESCRIPTION OF THE PREFERRED EMBODIMENTS

Figure 1:
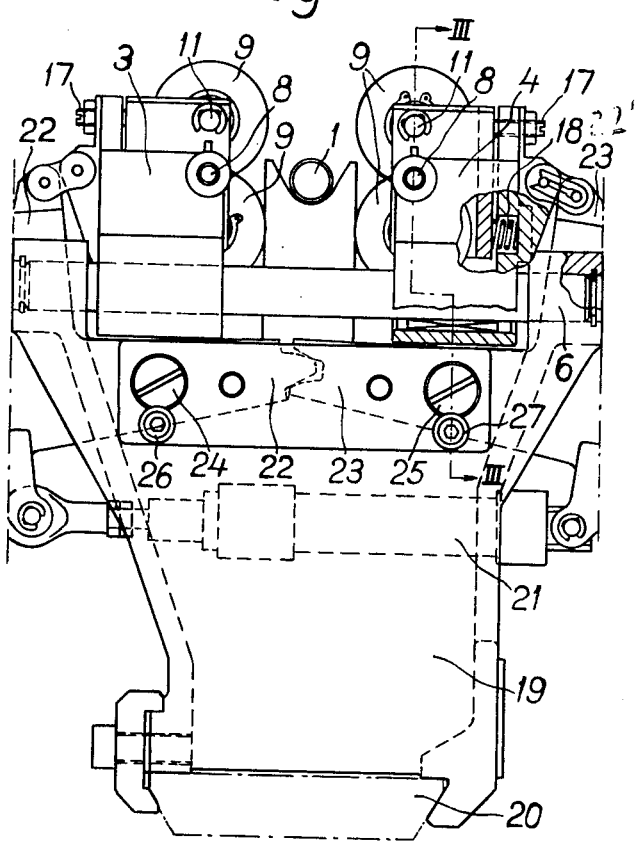
FIG. 1 is a side view with parts in section of the invention.
Figure 2:
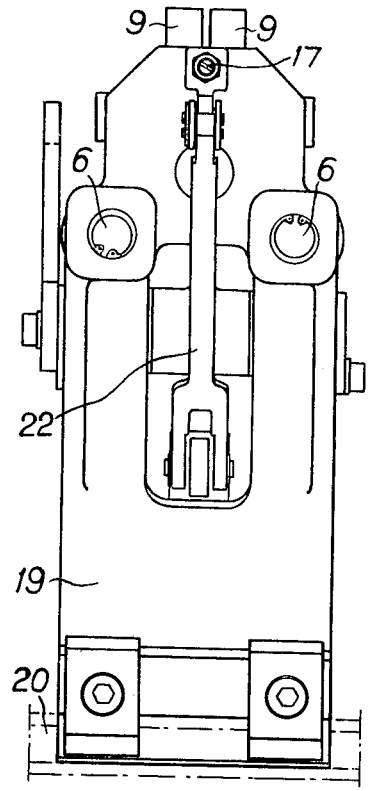
FIG. 2 is an end view of FIG. 1.
Figure 3:
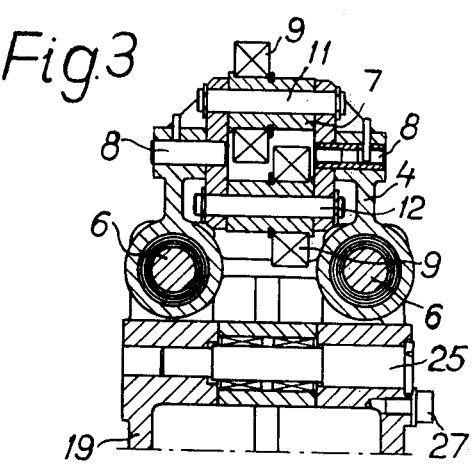
FIG. 3 is a cross-section along the line III—III of FIG. 1, FIG. 4 indicates the operation of the device of FIG. 1.
Figure 4:
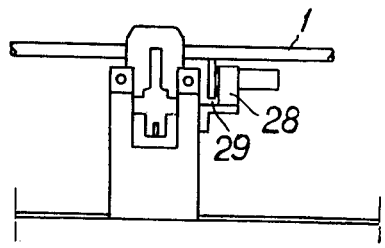
Figure 5:
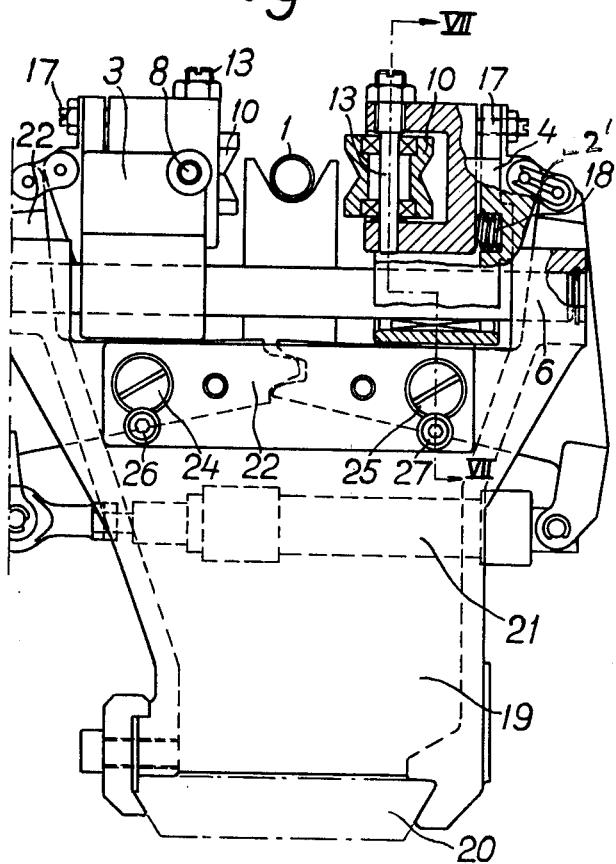
FIG. 5 is a view similar to FIG. 1 of a second embodiment.
Figure 6:
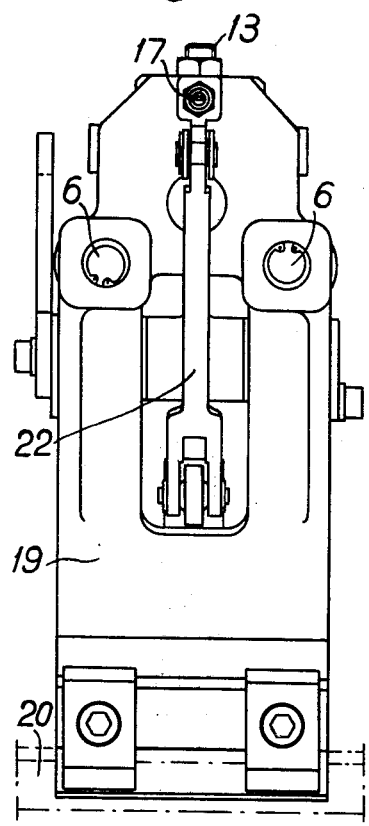
FIG. 6 is an end view of the arrangement shown in FIG. 5.
Figure 7:
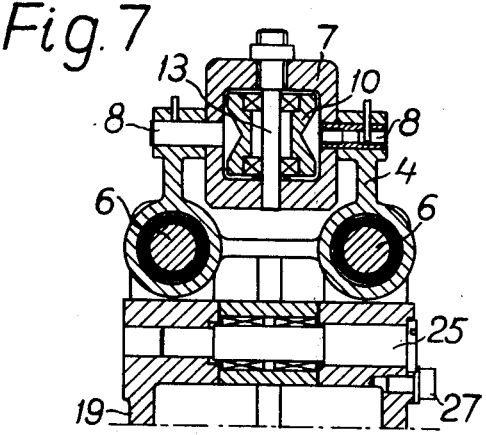
FIG. 7 is a section along the line VII—VII of FIG. 5.

In FIG. 1, 1 designates a tube to be centered, for example a fuel tube for a nuclear reactor. Two blocks 3 and 4 are formed as slides and are arranged on a common slide path 6. The slide path 6 consists of two rods which are attached to a frame 19 arranged to be transported on a rail 20 running in the longitudinal direction of the tube 1. The two blocks 3 and 4 can be pressed towards each other by means of a pressure cylinder 21, and the transmission of force is performed by means of two gear wheel segments 22 and 23 which are journalled on the shafts 24 and 25 mounted on the frame 19 and connected to the blocks by links 22'. Each of the blocks 3 and 4 contains a frame 7 which is turnably mounted on two journals 8 attached to such block. Each of the guide roller shafts 11 and 12 supports a rotatable cylindrical guide roller 9. The rotational movement of the frame 7 is limited in one direction by means of an adjustable stop screw 17 and in the other direction by means of a spring 18. The desired centered position can be adjusted vertically by means of the screw 17. Lateral adjustment is performed by the fact that the shafts 24 and 25 are eccentric and can be locked in the desired position by means of the screws 26 and 27, respectively. FIG. 4 shows how a tube 1 is set in rotation by means of a motor 28 and a pulley 29 in the embodiment of the invention shown in FIGS. 1, 2 and 3.

This construction permits rotation of the tube 1 about its axis even when it is clamped in the diverging surfaces of the rollers.

The second embodiment differs from that described above by the fact that each block 3 and 4 has only one guide roller. The corresponding guide roller shaft is designated 13' in the drawing. The guide roller, which is designated 10, is constructed with two conical side surfaces.

Figure 8:
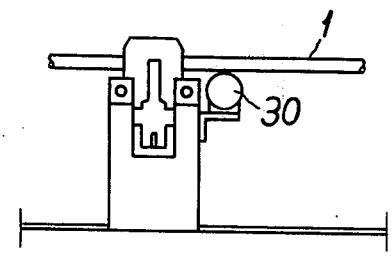
FIG. 8 illustrates the operation of said second embodiment.

FIG. 8 shows how a centered tube 1 is driven in the axial direction by means of a motor 30 with drive gears.

In this arrangement, therefore, the guide roll has converging surfaces from the end portions of greater diameter to the central portion. This permits longitudinal movement of the tube while it is centered between the rollers.

What is claimed is:

1. Centering device for bodies having a round cross-section comprising a pair of blocks, means mounting the blocks for sliding movement towards and from each other along a single straight line, power means for producing movement of the blocks, at least one of the blocks having a frame mounted thereon for swinging about an axis perpendicular to the direction of block movement, guide roller means turnably mounted on the frame, said roller means having diverging surfaces engageable with a tube, and adjustable means carried by the block and the frame to limit the swinging movement of the frame with respect to the block during operation of the centering device.

2. Device as claimed in claim 1, in which the roller means comprises two rollrs mounted on one of the frames to turn about spaced axes perpendicular to the direction of block movement and lying in parallel planes perpendicular to the direction of block movement.

3. Device as claimed in claim 1, in which the roller means comprises a roller having a thinner central portion and enlarged outer portions mounted to turn about an axis perpendicular to the direction of block movement.

4. Device as claimed in claim 1, in which the limiting means includes an adjustable stop screw between the block and the frame on one side of the swinging axis of the block and an elastic member between the frame and the block on the other side of such axis.

* * * * *